United States Patent
Forman et al.

(10) Patent No.: US 6,519,638 B1
(45) Date of Patent: Feb. 11, 2003

(54) OBJECT-ORIENTED FRAMEWORK FOR THE GENERIC COLLECTION OF SYSTEM DATA

(75) Inventors: Ronald F. Forman, Bryon, MN (US); Steven G. Halverson, Rochester, MN (US); David F. Legler, Rochester, MN (US); William A. Lynch, Rochester, MN (US); Larry N. Robel, Rochester, MN (US); Michael A. Schlasner, Rochester, MN (US); Walter H. Schwane, Mantorville, MN (US); Patrick M. Wildt, Rochester, MN (US); Keith A. Zblewski, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/323,295

(22) Filed: Jun. 1, 1999

(51) Int. Cl.[7] ............................................. G06F 15/173
(52) U.S. Cl. ....................................... 709/224; 709/223
(58) Field of Search ................................ 709/224, 317, 709/223, 202, 103 R (56) References Cited

U.S. PATENT DOCUMENTS 6,003,079 A * 12/1999 Friedrich et al. ............ 709/105
6,055,493 A * 4/2000 Ries et al. .................. 702/186
6,144,961 A * 11/2000 de la Salle .................. 707/10

* cited by examiner

Primary Examiner—Mehmet B. Geckil
(74) Attorney, Agent, or Firm—Schmeiser Olsen & Watts (57) ABSTRACT

The preferred embodiment of the present invention provides system for data collection that provides a solution that can be easily extended to collect different data types. The preferred embodiment provides a collection repository that stores different collected data types with a single consistent interface for accessing the collected data. The preferred embodiment is a data collector implemented from an object-oriented framework. The object-oriented data collector can be easily extended by adding additional instances of the data collector from the framework. The preferred embodiment framework includes mechanisms for global customization of the collector and synchronization of the collection. The preferred embodiment also includes base probe classes that define the probes that perform the actual collection of the system data and store the data in a common collection repository. Subclasses are provided to implement the collection of different types of system data. Thus, the preferred embodiment provides an extensible and flexible solution to the problem of collecting and analyzing different types of system data.

46 Claims, 6 Drawing Sheets

Collector Controller methods public:
static int timeToCycle (time_t timeVal);
static void internalCycle();
static int evaluateInterval (int interval);
static int isDefaultInterval (time_t timeVal) {return (timeVal % m_defaultInterval==0);}
static ypsMiCollectionObject* currentCollectionObj() {return m_collectionObj;} private:
static void readCollectorData()
static void writeCollectorData()
static void calculateNextCycleTime()
static int startRequest()
static int endRequest()
static int cycleRequest()
static int overrideRequest()
static int refreshRequest()
static void colObjRequest()
static void probeEndRequest()
static void atBegin()
static void atEnd()
static void loadProfile()
static void loadOverrides()
static void createCollectionObj()
static void synchronizeProbes()
static void MsgToQsysopr()
static void collectionObjExpirationThread()

FIG. 4

Collector Synchronizer methods public:
static void setSyncInterval (int seconds);
static void start()
static void stop()

private:
static void synchronizerThread()
static void workerThread()
static void sleeptoSyncBdy()
static int secFrmLastBdy()
static void collect()

FIG. 5

Base Probe methods public:
void start()
void stop()
void endAbnormal()
void enqueue(ypsProbeCategory *categoryProfile)
int timeToCollect (time_t timeVal)
int addCategory (ypsProbeCategory *categoryProfile)
int addCategoryOverride (ypsProbeCategory *categoryProfile)
void removeCategory (char* categoryName)
int getCategoryCount() const
ypsProbeCategory* getCategory (int index)
ypsProbeCategory* getCategory (char* name)
ypsProbeCategory* getCategory (char* name, int &index)

protected:
virtual void doBegin (char *categoryName, char *parms) = 0
virtual void doCollect (const ypsCategoryNameArray &categoryNames) = 0
virtual void doEnd (char *categoryName) = 0
virtual char* getRepositoryName (char *categoryName) = 0
virtual void openRepository (char *categoryName) {return &m_repository}
virtual void closeRepository (char *categoryName)
virtual void setRepositoryInteval (char *categoryName, int interval, ypsRpBeginEndIndicator beginEndIndicator)

private:
static void clearCategories();
static void subtractCategorySettings (ypsProbeCategory *category);
void beginCategory (ypsProbeCategory *category);
void begin()
void collect()
void collectAtBegin()
void collectAtInterval()
void collectAtEnd()
void endCategory (ypsProbeCategory *category);
void end()
void handleException (const ypsException &exp);

FIG. 6

OBJECT-ORIENTED FRAMEWORK FOR THE GENERIC COLLECTION OF SYSTEM DATA

BACKGROUND OF THE INVENTION

1. Technical Field

The present invention relates in general to the computer programming. More specifically, the present invention relates to the collection of system data in a computer system.

2. Background Art

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network. One of the recent advances in the field of software development has been the emergence of object oriented programming technology.

The goal of using object-oriented programming is to create small, reusable sections of program code known as objects that can be quickly and easily combined and re-used to create new programs. This is similar to the idea of using the same set of building blocks again and again to create many different structures. The modular and re-usable aspects of objects typically speeds development of new programs, thereby reducing the costs associated with the development cycle. In addition, by creating and re-using a group of well-tested objects, a more stable, uniform, and consistent approach to developing computer programs can be achieved.

Although object-oriented programming offers significant improvements over other programming types, program development still requires significant amounts of time and effort, especially if no preexisting objects are available as a starting point. Consequently, one approach has been to provide a program developer with a set of pre-defined, interconnected classes that facilitate the creation of a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object-oriented program.

While object-oriented programming and the use of frameworks has greatly simplified the task of creating useful and efficient computer programs, some difficulties remain. For example, many advanced computers and operating systems need to collect system data in order to track things such as performance, system utilization, system resources, etc. Previous collectors have been limited to collecting data only when specially requested to do so. Additionally, previous data collectors have used seperate programs for each distinct type of data collected. Multiple distinct collectors present the problem of multiple programs with dissimilar interfaces and data storage mechanisms. This makes it difficult to extend these programs when additional data types need to be added to those being collected. Additionally, because individual data collection programs have typically used different data storage techniques, and require different procedures for accessing the stored data, it can also be difficult to write tools that analyze the information contained by the multiple data types.

Thus, what is needed is an improved mechanism and method for collecting system data that provides increased flexibility for collecting different types of system data and a more consistent interface for facilitating system data analysis.

DISCLOSURE OF THE INVENTION

According to the present invention, a component based system data collection mechanism provides a solution that can be easily extended to collect different data types. The preferred embodiment provides a collection repository that stores different collected data types with a single consistent interface for accessing the collected data. The preferred embodiment is a data collector implemented from an object-oriented framework. The object-oriented data collector can be easily extended by adding additional instances of the data collector from the framework. The preferred embodiment framework includes mechanisms for global customization of the collector and synchronization of the collection. The preferred embodiment also includes base probe classes that define the probes that perform the actual collection of the system data and store the data in a common collection repository. Subclasses are provided to implement the collection of different types of system data. Thus, the preferred embodiment provides an extensible and flexible solution to the problem of collecting and analyzing different types of system data.

The foregoing and other features and advantages of the present invention will be apparent from the following more particular description of the preferred embodiment of the invention, as illustrated in the accompanying drawings.

BEST MODE FOR CARRYING OUT THE INVENTION

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

1. Overview
Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are called objects. Object-oriented technology is significantly different from procedural technology because problems are broken down into sets of cooperating objects instead of into hierarchies of nested computer programs or procedures.

A pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is-through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The request message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and Java are all examples of languages that support object-oriented programming to some degree.

Object-oriented Frameworks

Terms and phrases have evolved with particular meaning to those skilled in the art of object-oriented design. However, the reader should note that one of loosest definitions in this art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe a mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

While in general terms an object-oriented framework mechanism can be properly characterized as an object-oriented solution, there is nevertheless a fundamental difference between a framework mechanism and a basic object-oriented solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not subject to potential customization and extension by the framework consumer) and the extensible function of the framework (i. e., that part of the framework that is subject to potential customization and extension). In the end, the ultimate worth of a framework mechanism rests not only on the quality of the object design, but also on the design choices involving which aspects of the framework represent core function and which aspects represent extensible function.

2. Detailed Description

Figure 1:
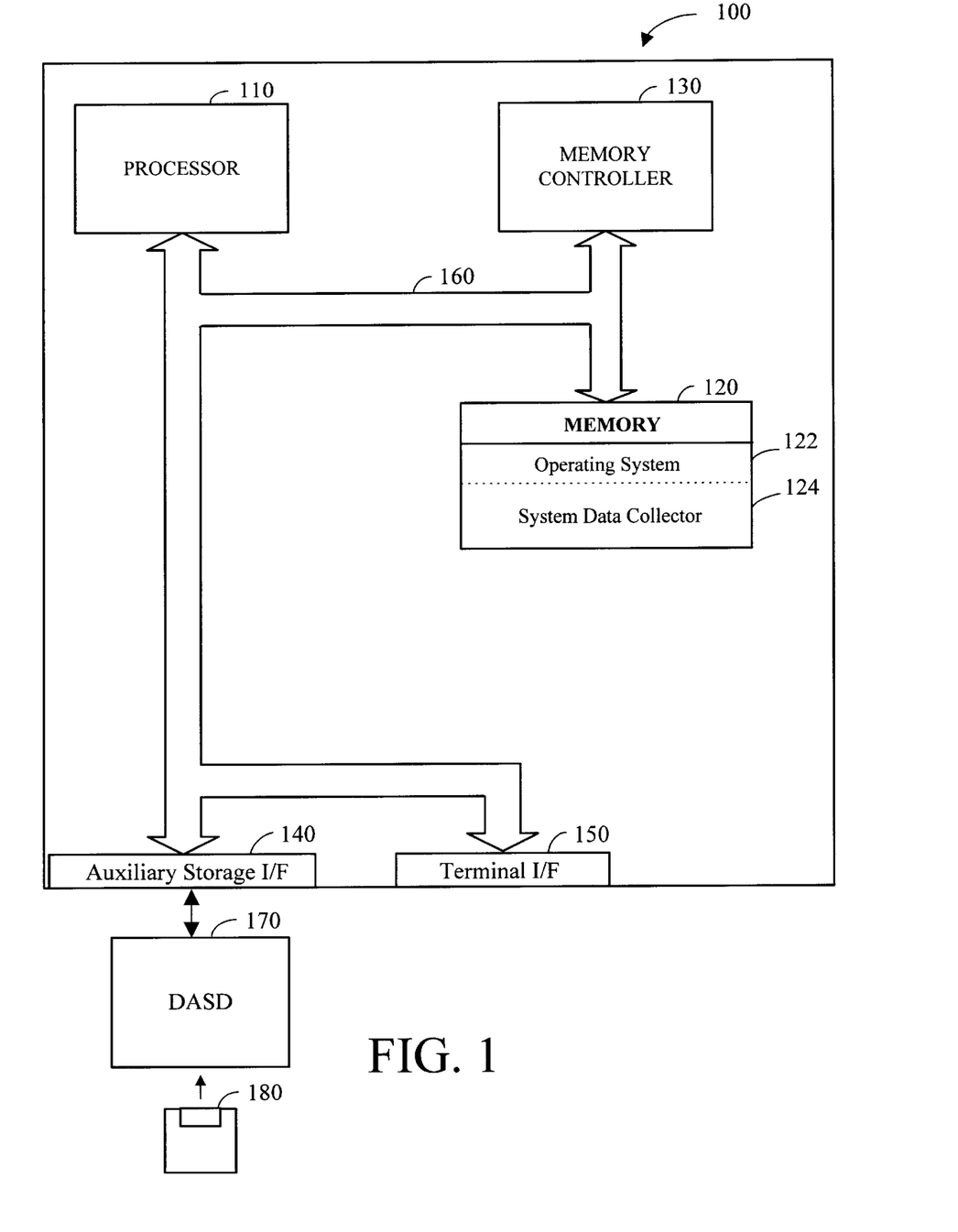
FIG. 1 is a schematic view of a computer system in accordance with a preferred embodiment of the present invention.

Referring now to FIG. 1, a computer system 100 in accordance with a preferred embodiment of the present invention is an IBM AS/400 system, although other computers, such as standard IBM compatible 32-bit computer systems, or other PowerPC based systems can be used. Those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although system 100 depicted in FIG. 1 contains only a single main processor 110 and a single system bus 160, it should be understood that the present invention applies equally to computer systems having multiple processors and multiple system buses. Similarly, although system bus 160 of the preferred embodiment is a typical hardwired, multi-drop bus, any connection means that supports-directional communication in a computer-related environment could be used.

In the preferred embodiment, memory 120 suitably includes an operating system 122 and a system data collector 124. It should be understood that for purposes of this application, memory 120 is used to refer to memory in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Operating system 122 provides the basic functionality that controls computer system 100. Operating system 122 can comprise any suitable operating system, such as IBM's OS/400, OS/390, OS/2, Microsoft's Windows, Java and the various flavors of UNIX.

In accordance with the preferred embodiment of the present invention, system data collector 124 provides a solution that can be easily extended to collect different data types. The preferred embodiment additionally provides a collection repository that stores the different collected data types with a single consistent interface for accessing the collected data.

In the preferred embodiment system data collector 124 is implemented from an object-oriented framework. The object-oriented data collector can be easily extended by adding additional instances of the data collector objects from the framework. The preferred embodiment framework includes mechanisms for global customization of data collector 124 and synchronization of the collection. The preferred embodiment also includes probe classes that do the actual collection of the system data and store the data in a common collection repository. Subclasses can be easily added to the base probe classes to facilitate the collection of new types of system data.

Figure 2:
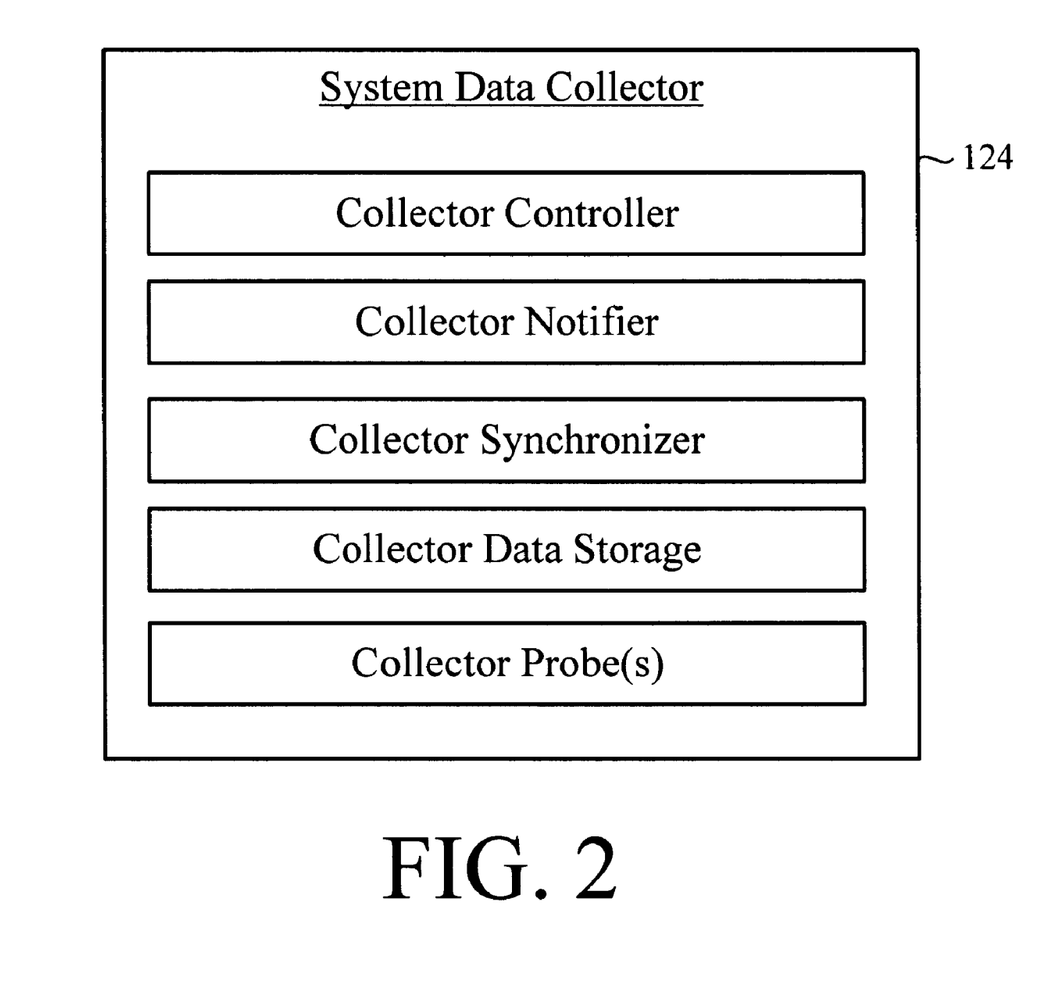
FIG. 2 is a functional block diagram system data collector in accordance with the preferred embodiment.

Referring now to FIG. 2, the key functional software elements of the preferred embodiment are illustrated schematically to better portray their functionality. In particular, the preferred system data collector 124 includes a collector controller, a collector notifier, a collector synchronizer, a collector data storage area and one or more collector probes.

The collector controller controls the interface to the system data collector, and includes references to the other objects in the collector. The collector controller includes a "table" of global configuration data used to control the operation of the system data collector. This global configuration data is read in a run time and describes what parameters are to be collected, how often, what the legal values for each parameter are, etc.

The collector notifier provides notification to other parts of the system 100 as requested. In particular, the collector notifier object allows other systems to specify the type and frequency of event notifications to be sent to the other parts of the system. This would typically be used for notifying that a particular probe has finished collecting data, notifying that the data collector is about to cycle to a new collection object, or notifying that the data collector is about to end operation.

The collector synchronizer keeps track of the system clock time and alerts the probes of the time such that they can collect data at their specified intervals. This synchronizes the collection of data by the various probes and allows their collected data to be synchronized together. This can be particularly important when an analyzer is examining different pieces of collected data corresponding to a particular time to determine what happened to a system at that time.

The collector data storage stores all the data received from the probes in the system data collector. Because all the data is stored in a central location, it is easier for tools to analyze and compare the various collected data.

The collector probes are the objects used to actually collect the system data. Preferably, a probe object exists for each type of system data that is to be collected. In the preferred embodiment, the various collector probes are instantiations from a defined probe class, with only minor modifications defined in appropriate subclasses to facilitate the collection of different types of system data. This provides improved flexibility and extensibility of the preferred solution.

Figure 3:
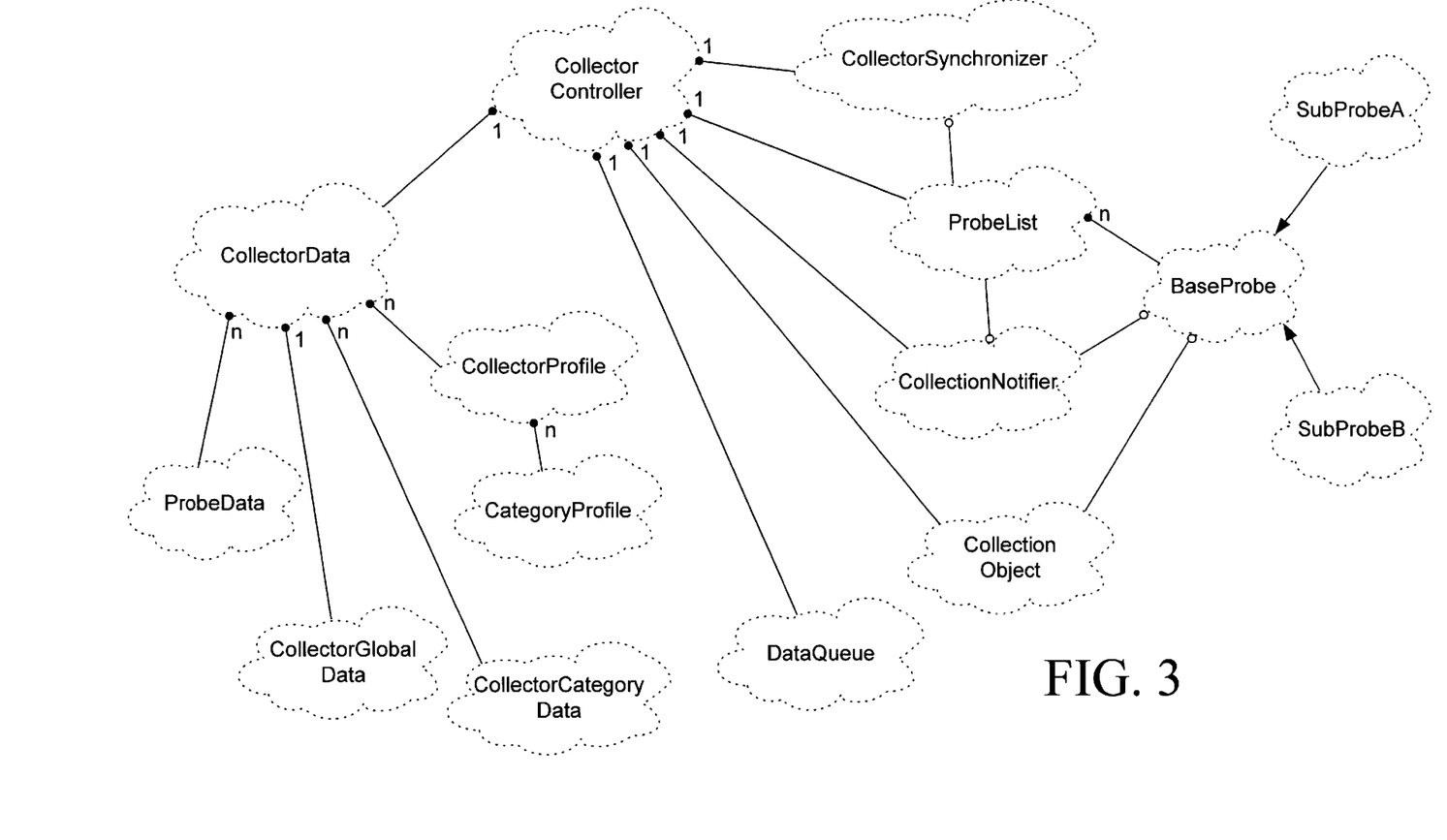
FIG. 3 is an object diagram illustrating the preferred embodiment system data collector framework.

As discussed above, the preferred embodiment system data collector is instantiated from an object oriented framework. Turning now to FIG. 3, the preferred embodiment framework is illustrated in more detail. The framework defines the basic classes from which the preferred embodiment system data collect can be instantiated. The framework includes a collector controller class, a collector data class, a probe data class, a collector global data class, a collector category data class, a collector profile class, a category profile class, a collector synchronizer class, a data queue class, a collection object class, a probe list class, a collector notifier class, a base probe class, and one or more subprobe classes. Typically, for each system data collector that is created, at least one object would be instantiated from each class. For example, one subprobe object would be instantiated for each probe, with each probe collecting one type of system data. Each of these classes and their associated objects will now be discussed in more detail.

The collector controller, collector data, probe data, collector global data, collector category data, collector profile and category profile objects together provide the "collector controller" function described with reference to FIG. 2. In the preferred embodiment, the collector object serves as the main interface to the system data collector. The collector object monitors for requests from external sources to do things like start collection, end collection, and cycle to a new collection object. The collector controller object includes references to the other objects that make up the system data collector. The collector controller object reads configuration data from the group of configuration objects, and uses that configuration data to control the operation of the collector. The collector controller also controls the main thread of the program.

Figure 4:
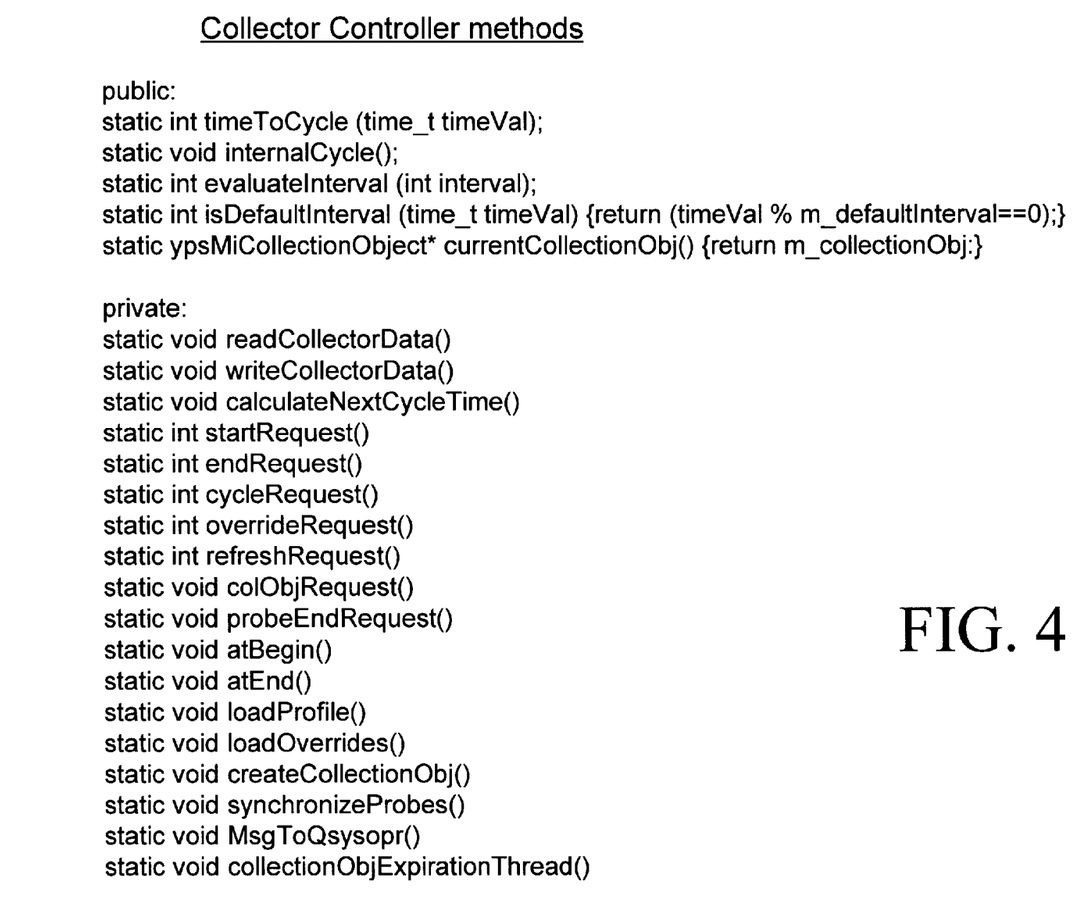
FIG. 4 is a listing of exemplary collector object methods in accordance with the preferred embodiment.

Turning briefly to FIG. 4, an exemplary listing of the preferred implementation methods on the collector controller object is illustrated. Of course, this is just an example of how the collector controller object could be implemented, and those skilled in the art will recognize that these methods could easily be replaced with other methods that perform the needed functions. The preferred collector controller object methods include methods to read and write the stored collector data, methods to start, end, cycle, override and refresh requests that come, methods to load profiles and overrides, create collection objects, etc.

The collector data, probe data, collector global data, collector category data, collector profile and collector category profile objects together provide a "table" of global configuration data used to control the operation of the system data collector. This global configuration data is read in at run time and describes the parameters to be collected, the frequency of collection, the permissible values for each parameter, etc. Thus, to modify the operation of the system data collector a user needs only to modify the corresponding properties in these configuration objects.

For example, the collector data object provides the external storage for the "table" of configuration information. In particular, the collector data object serves as the container for the objects that store the configuration information (i.e., probe data, collector global data, collector category data, collector profile, and collector category profile objects). The configuration information is retrieved at run time and used to control the operation of the collector. A developer can thus plug in a new collector data object that contains a different collector configuration (e.g., different probe data objects, etc) and easily change the operation of the collector. The collector data object preferably includes appropriate get methods to retrieve specified configuration information.

Included in this configuration data is a listing of all the probes by probe name, a listing of all the valid categories, and a listing of which probes are assigned to which categories. There are also profiles that group together logically related categories, and list active attributes of the group of logically related categories.

In particular, a probe data object preferably exists for each probe. The probe data object includes the name of the probe and the information necessary to create the corresponding probe. For example, a service program that contains the executable C++ object for the probe. The probe data object thus describes the corresponding probe and the information needed to connect to the corresponding probe data object. Additionally, the stored probe data name can then be the name of another object in the collector that references the corresponding probe.

The collector global data object stores the parameters that are global to the entire system data collector. This would typically include parameters such as the library in which collection objects are stored, the frequency of synchronizer operations, the default collection intervals, and other data that applies to all probes and all categories.

The collector category data object describes the data type categories that can be collected by the system data collector. This object also describes which probes can be used to collect which data types. Thus, the collector category data object associates data types with collector probes.

The collector profile object describes logical groupings of categories. Each logical grouping of categories includes the data types that are desirably collected together so they can be better analyzed together. Preferably, a collector profile object is created for each logical grouping of categories. For example, a "disk performance" group may include five different collector categories that are related to disk performance. The collector profile object is used to store the configuration data that is common to the corresponding logical group of categories, and in particular the dynamic data needed at run time.

The collector profile object references a category profile object for each category. Each category profile object describes the parameters for collecting its associated category of system data. Preferably, a category profile object exists for each data type category, and describes how often its associated data type is to be collected. For example, each category profile object could contain the name of the category, the interval at which it is going to be collected, any parameters needed to initialize the category, valid intervals, what probe will collect for the category, a description of the category, the default collection interval for the category, and whether that collection interval can be overridden.

Thus, the collector profile object describes the logical groupings of category objects and parameters that are specific to that grouping. The parameters that are specific to each category are stored in their associated collector category profile.

The collector synchronizer object is used to synchronize the operation of the collector with the system clock and let the probe objects know when to collect data. This can be used to synchronize the collected data to allow for more efficient analyzation of different types of data. Preferably, this object operates in its own thread that counts predetermined time intervals (e.g., 15 seconds). If for some reason this thread sleeps longer than the predetermined time interval, it does an automatic correction to keep in sync with the actual time clock. At the end of the interval the synchronizer wakes up and calls a worker thread which the queries each probe, asking the probe whether it is time to collect (with the time to collect being set in the category profile object for the category of data being collected by the probe). If the probe indicates that it is time to collect, a collect request will be enqued to the probe. Those probes whose time it is to collect can then start and collect in a synchronized manner. This synchronization scheme allows other external objects to be notified of special events, such as when a collector probe is going to begin or end collecting.

Figure 5:
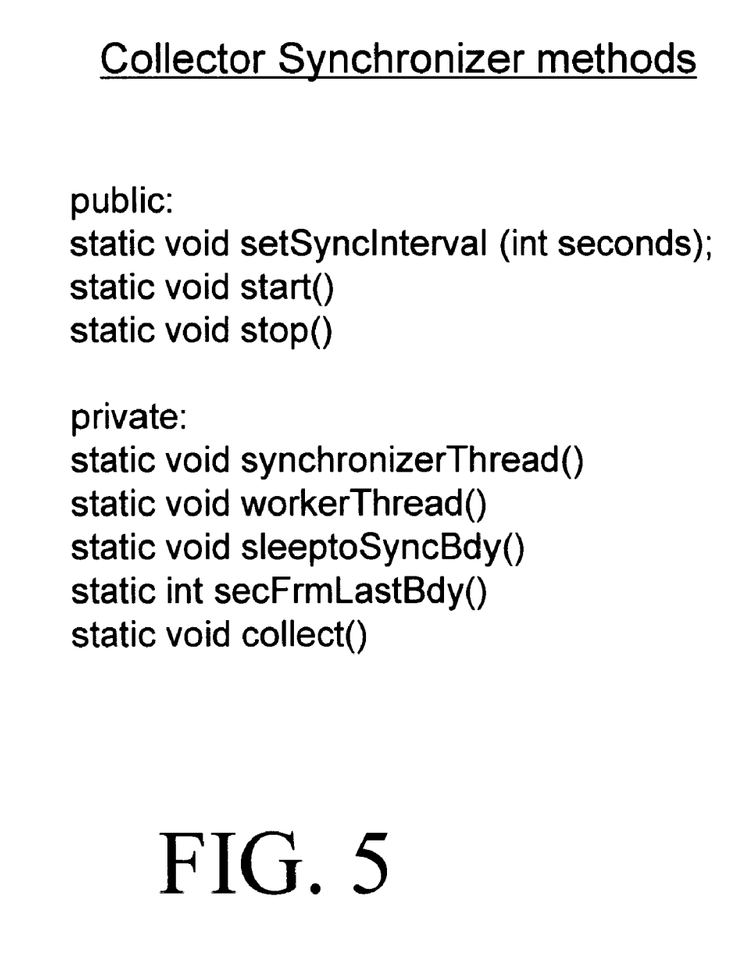
FIG. 5 is a listing of exemplary synchronizer object methods in accordance with the preferred embodiment.

Turning briefly to FIG. 5, an exemplary listing of the preferred methods on the collector synchronizer object is illustrated. Of course, this is just an example of how the collector synchronizer could be implemented, and those skilled in the art will recognize that these methods could easily be replaced with other methods that perform the needed functions. The preferred collector synchronizer includes methods to start synchronizer threads and worker threads, and methods that the threads use to determine how long to sleep before the next collection interval starts.

The probe list object serves as a container for references to the various probes. This allows the probes to be passed to other entities as needed.

The collector notifier object provides notification to other objects as requested. In particular, the collector notifier object includes methods to allow other objects to specify when, where and what type of notifications they want. The collector notifier object also includes a method to send notification to those objects when the corresponding probe does something that the object has requested notification on. This would typically be used for notifying that a particular probe has finished collecting data, notifying that the collector is about to cycle to a new collection object, or that the collector is about to end. It could also be used to notify when certain types of data are collected or other important events.

The collection object provides repositories for the collected system data. Preferably, the collection object stores all the collected system data together in a way that allows the collected system data to be read using a consistent interface. A new collection object can be cycled to store the collected data as needed. Preferably, the collection object is implemented as a system data object such as an OS/400 management collection object. This OS/400 object is designed to store large amounts of data and can be divided into one or more "repositories" to collect and store different categories of data. Of course, other suitable repository type objects could be used as a collection object.

Storing the collection data in such an object allows the data to be easily referenced from a single source using consistent interfaces. This allows other analysis tools to easily extract the data for disparate categories of collection objects.

The data queue object handles data for requests by outside agents. In particular, the collector controller object preferably includes a thread to monitor the data queue for incoming requests. Thus, the data queue object serves as the main interface to the collector controller object. When incoming requests are received by the data queue object they are passed on to the collector controller object which then performs the requested function. For example, the requested function might be to start or end the collector, to request a type of notification, to start running different profile, to override a collection interval, etc.

In the preferred embodiment, the collection probes are implemented using object oriented techniques that define and implement the probes in a base probe class that includes the basic implementation of the probes, and a plurality of subprobe classes that provides override methods that do the actual collection of system data. The base probe class defines the mechanisms needed to schedule collection of data and the storage of the collected system data in the collection object. The base probe class includes the base methods and data needed for the probes to operate. The base probe class also preferably includes virtual methods that perform the actual data collection. These virtual collection methods are then overridden and implemented in subprobe classes objects that inherit from the base probe class. For example, subprobe classes could be defined that override the virtual collection methods as needed to collect data such as CPU usage, disk activity, IOP activity, Comm related activity, etc.

Figure 6:
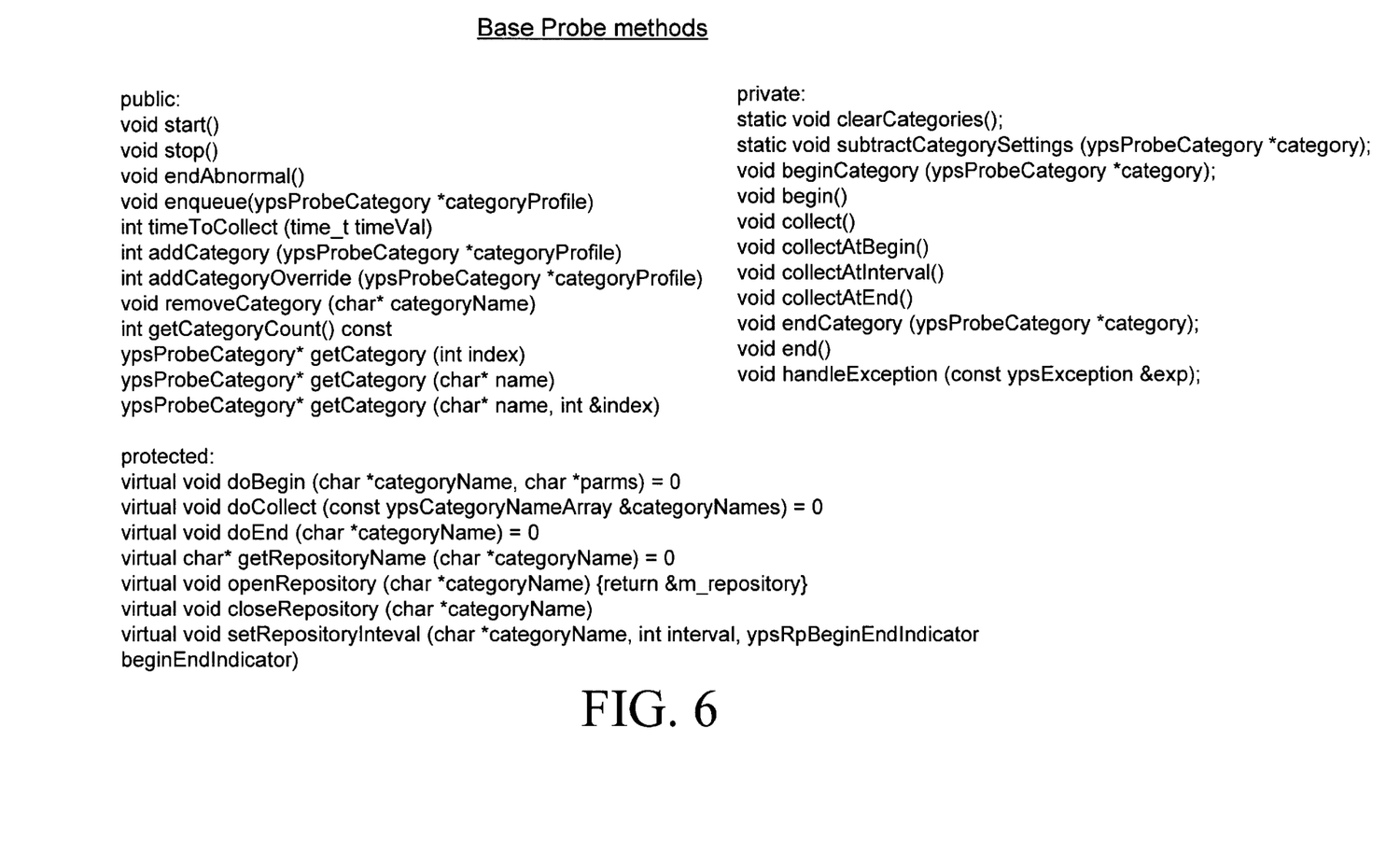
FIG. 6 is a listing of exemplary base probe object methods in accordance with the preferred embodiment.

Turning briefly to FIG. 6, an exemplary listing of the preferred methods on the base probe object is illustrated. Of course, this is just an example of how the base probe object could be implemented, and those skilled in the art will recognize that these methods could easily be replaced with other methods that perform the needed functions.

In particular, the base probe class preferably includes start and stop methods to control the threads, allowing each probe object to control its own threads. The base probe class also preferably includes methods to allow the probe object to begin and end operation, and perform any necessary clean up. The base probe class also preferably includes an time to collect method called by the collector synchronizer to determine if it is time to collect and an enqueue method also called by the collector synchronizer when it is time to collect. The base probe class also preferably includes methods to add a collection category for a new probe object, remove a collection category, and retrieve a pointer to the probe object. Preferably each probe object runs in its own thread. This allows each probe to collect system data simultaneously.

The base probe class also preferably defines a virtual doBegin method for initializing data collection; a virtual doEnd method for ending collection; and a virtual doCollect method that actually performs the collection. These virtual methods are then implemented by the various subprobe classes, with each subprobe class defining how probe objects from that class perform these operations. Thus, to define a new subprobe class to collect a new data type a developer needs only to implement the methods for initializing collection, ending collection and cleaning up, and a method for performing the actual collection. The rest of the probes functionality is provided by the base probe class.

Thus, the developer first constructs an appropriate subprobe object and initializes any needed variables. To implement a doBegin method a developer would typically involve a collection repository, i.e., the location in which the collected data is to be stored. This could involve the creation of a collection object, or just the opening of a repository in a previously created collection object. Also, any operations needed to prepare the new collection object would be performed, such as updating any table or data that is common to all probes.

To implement a doCollect method a developer defines how and where to collect the desired system data. This would typically involve calling the appropriate system related function to obtain the base data. For example, to obtain CPU utilization, a low level machine instruction could be called to provide the CPU utilization for each processor. The developer would then specify calling these methods to get the data, and then define the calculations needed to put the data together in the proper format (such as averaging data, etc). Once the data has been calculated it can be stored in the current collection object. The doCollect method preferably accepts an array of category names that are to be collected as a parameter.

To implement the doEnd method the developer would define the operations needed to close out a collection category. This method would then be called when the probe is no longer needed to collect data, the collector is shutting down, or when a collection object has been cycled. In many cases the only operation needed to shutdown would be to close the current repository for the collected data.

The preferred base probe object includes an enqueue method to add pieces of work for the probe thread to perform. The addCategory method is used to add new categories to what the probe is currently collecting. As discussed above, the base probe object includes virtual methods that can be overridden by the subprobes. These virtual methods also include methods to get, open, and close the repository used to store the data. In many cases these methods will be performed as defined in the base probe object, although their virtual status allows them to be overridden in subprobe objects if desired by the developer. Various other private methods are used by the base probe object to perform the work requested by the queue.

In addition to the various subprobe classes used to define collectors for various data types, the preferred embodiment includes a program probe subclass of the base probe class. This is used to allow the invocation of probes that are implemented as external programs. Thus, external, self contained programs can be used as collector probes. This gives can give customers the flexibility to plug in their own probes in addition to those provided by the framework developer.

Thus, the preferred embodiment provides an object oriented framework for the collection of system data. By providing such an object oriented framework, the preferred embodiment of the present invention provides an extensible and flexible solution to the problem of collecting, storing and analyzing a wide variety of system data. In particular, by providing the various collector probes as instantiations from a defined probe class, only minor modifications as defined in appropriate subclasses are needed to facilitate the collection of different types of system data.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. For example, while the preferred embodiment has been described with reference to an object-oriented framework solution, it could also be implemented with another component based programming environment. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   an object-oriented system data collector framework residing in the memory, the system data collector framework providing a system data collector for collecting a plurality of system data types, the system data collector framework comprising a base probe class for defining the general operation of a plurality of system data collector probes and a plurality of subprobe classes, with each subprobe class defining system data type specific collection behavior for at least one of the plurality of system data collector probes.

2. The apparatus of claim 1 wherein the base probe class defines a virtual collection method for collecting system data, and wherein each of the plurality of subprobe classes implements the virtual collection method for collecting system data to collect a corresponding one of the plurality of data types.

3. The apparatus of claim 2 wherein the base probe class define a start data collection method and an end data collection method, and wherein the base probe class further defines an enqueue method for adding new collection jobs to the plurality of system data collector probes.

4. The apparatus of claim 1 wherein the system data collector framework additionally comprises a collector notifier class defining a collector notifier object for providing notification to other systems of collection events as requested.

5. The apparatus of claim 1 wherein the system data collector framework additionally comprises a collection class defining a collection object to store collected system data, the collection object providing a common storage for the collected plurality of data types.

6. The apparatus of claim 5 wherein the collection object comprises an OS/400 management collection object that includes a plurality of repositories with each of the plurality of repositories storing one of the plurality of data types.

7. The apparatus of claim 1 wherein the system data collector framework additionally comprises a collector controller class defining a collector controller object for providing an interface to the system data collector and a table of configuration data to control the operation of the system data collector.

8. The apparatus of claim 7 wherein the system data collector framework additionally comprises:
   a probe data class defining probe data objects for storing a reference to a corresponding system data collector probe;
   a collector global data class defining a collector global data object for storing parameters global to the system data collector object;
   a collector category class defining collector category objects for defining categories of system data types and defining which of the system data collector probes can be used to collect which of the categories of system data types;
   a collector profile class defining a collector profile object describing logical groupings of the categories of system data types; and
   a category profile class defining category profile objects describing collection parameters for corresponding categories of system data types;
   and wherein the probe data objects, collector global data object, collector category objects, collector profile object and category profile objects are read at run time to provide the table of configuration data.

9. The apparatus of claim 1 wherein the system data collector frame additionally comprises a collector synchronizer class defining a collector synchronizer object for tracking a system clock to synchronize data collection.

10. The apparatus of claim 9 wherein the collector synchronizer object counts predetermined time intervals and queries each probe at the end of the predetermined time interval to determine if it is time for the probe to collect system data, and wherein the collector synchronizer object then enqueues a collect request on any probe for which it is time to collect system data.

11. An apparatus comprising:
    at least one processor;
    a memory coupled to the at least one processor;
    an object-oriented framework mechanism residing in the memory, the framework mechanism providing a system data collector for collecting and storing system data, the system data collector framework comprising:
a) a collector controller providing an interface to the system data collector and a table of configuration data to control the operation of the system data collector;
b) a collector notifier providing notification to other systems of collection events as requested;
c) a collector synchronizer for tracking a system clock to synchronize data collection;
d) a collection object to store collected system data; and
e) a plurality of collector probes, each of the plurality of collector probes collecting a corresponding type of system data as determined by the collector controller and storing the collected system data in the collection object.

12. The apparatus of claim 11 wherein the at least one collector probes are implemented from a base probe class and a plurality of subprobe classes, the base probe class defining the general operation of the at the at least one collector probe and the at least one subprobe classes defining the specific collection of the corresponding type of system data.

13. The apparatus of claim 12 wherein the base probe class defines a virtual collection method for collecting system data, and wherein each of the plurality of subprobe classes implements the virtual collection method for collecting system data to collect the corresponding type of system data.

14. The apparatus of claim 12 wherein the base probe class defines a start data collection method and an end data collection method, and wherein the base probe class further defines an enqueue method for adding new collection jobs to the plurality of system data collector probes.

15. The apparatus of claim 11 wherein the collection object comprises an OS/400 management collection object that includes a plurality of repositories with each of the plurality of repositories storing one of the plurality of data types.

16. A program product comprising:
(A) an object-oriented system data collector framework providing a system data collector for collecting a plurality of system data types, the system data collector framework comprising a base probe class for defining the general operation of a plurality of system data collector probes and a plurality of subprobe classes, with each subprobe class defining system data type specific collection behavior for at least one of the plurality of system data collector probes; and
(B) signal bearing media bearing the system data collector framework.

17. The program product of claim 16 wherein the signal bearing media comprises recordable media.

18. The program product of claim 16 wherein the signal bearing media comprises transmission media.

19. The program product of claim 16 wherein the base probe class defines a virtual collection method for collecting system data, and wherein each of the plurality of subprobe classes implements the virtual collection method for collecting system data to collect a corresponding one of the plurality of data types.

20. The program product of claim 19 wherein the base probe class define a start data collection method and an end data collection method, and wherein the base probe class further defines an enqueue method for adding new collection jobs to the plurality of system data collector probes.

21. The program product of claim 16 wherein the system data collector framework additionally comprises a collector notifier class defining a collector notifier object for providing notification to other systems of collection events as requested.

22. The program product of claim 16 wherein the system data collector framework additionally comprises a collection class defining a collection object to store collected system data, the collection object providing a common storage for the collected plurality of data types.

23. The program product of claim 22 wherein the collection object comprises an OS/400 management collection object that includes a plurality of repositories with each of the plurality of repositories storing one of the plurality of data types.

24. The program product of claim 16 wherein the system data collector framework additionally comprises a collector controller class defining a collector controller object for providing an interface to the system data collector and a table of configuration data to control the operation of the system data collector.

25. The program product of claim 24 wherein the system data collector framework additionally comprises:
a probe data class defining probe data objects for storing a reference to a corresponding system data collector probe;
a collector global data class defining a collector global data object for storing parameters global to the system data collector object;
a collector category class defining collector category objects for defining categories of system data types and defining which of the system data collector probes can be used to collect which of the categories of system data types;
a collector profile class defining a collector profile object describing logical groupings of the categories of system data types; and
a category profile class defining category profile objects describing collection parameters for corresponding categories of system data types;
and wherein the probe data objects, collector global data object, collector category objects, collector profile object and category profile objects are read at run time to provide the table of configuration data.

26. The program product of claim 16 wherein the system data collector frame additionally comprises a collector synchronizer class defining a collector synchronizer object for tracking a system clock to synchronize data collection.

27. The program product of claim 26 wherein the collector synchronizer object counts predetermined time intervals and queries each probe at the end of the predetermined time interval to determine if it is time for the probe to collect system data, and wherein the collector synchronizer object then enqueues a collect request on any probe for which it is time to collect system data.

28. A program product comprising:
(A) an object-oriented framework providing a system data collector for collecting and storing system data, the system data collector framework comprising:
a) a collector controller providing an interface to the system data collector and a table of configuration data to control the operation of the system data collector;
b) a collector notifier providing notification to other systems of collection events as requested;
c) a collector synchronizer for tracking a system clock to synchronize data collection;
d) a collection object to store collected system data; and e) a plurality of collector probes, each of the plurality of collector probes collecting a corresponding type of system data as determined by the collector controller and storing the collected system data in the collection object;

(B) signal bearing media bearing the system data collector framework.

29. The program product of claim 28 wherein the signal bearing media comprises recordable media.

30. The program product of claim 28 wherein the signal bearing media comprises transmission media.

31. The program product of claim 28 wherein the at least one collector probes are implemented from a base probe class and a plurality of subprobe classes, the base probe class defining the general operation of the at the at least one collector probe and the at least one subprobe classes defining the specific collection of the corresponding type of system data.

32. The program product of claim 31 wherein the base probe class defines a virtual collection method for collecting system data, and wherein each of the plurality of subprobe classes implements the virtual collection method for collecting system data to collect the corresponding type of system data.

33. The program product of claim 31 wherein the base probe class defines a start data collection method and an end data collection method, and wherein the base probe class further defines an enqueue method for adding new collection jobs to the plurality of system data collector probes.

34. The program product of claim 28 wherein the collection object comprises an OS/400 management collection object that includes a plurality of repositories with each of the plurality of repositories storing one of the plurality of data types.

35. A method for collecting system data, the method comprising the steps of:
   a) providing an object oriented system data collector, the system data collector including a plurality of probes to collect a plurality of system data types;
   b) collecting the plurality of system data types with the plurality of probes; and
   c) storing the collected system data in a collection object having a plurality of repositories, with each of the plurality of repositories storing one of the plurality of system data types.

36. The method of claim 35 wherein the step of providing the plurality of probes comprises providing a base probe class and a plurality of subprobe classes, the base probe class defining the general operation of the at the at least one collector probe and the at least one subprobe classes defining the specific collection of the corresponding type of system data.

37. The method of claim 36 wherein the base probe class defines a virtual collection method for collecting system data, and wherein each of the plurality of subprobe classes implements the virtual collection method for collecting system data to collect the corresponding type of system data.

38. The method of claim 36 further comprising the step of creating a new collector probe for a new system data type by instantiating a new probe from the base probe class and from the subprobe class, the subprobe class defining the collection of the new system data type.

39. The method of claim 35 wherein the step of providing an object oriented system data collector additionally comprises providing a collector controller, the collector controller providing an interface to the system data collector and a table of configuration data to control the operation of the system data collector, wherein the configuration data is read in at run time to control the operation of the system data collector.

40. The method of claim 39 wherein the step of providing a system data collector additionally comprises providing a collector notifier providing notification to other systems of collection events as requested and providing a collector synchronizer for tracking a system clock to synchronize data collection.

41. A method for collecting a plurality of system data types, the method comprising the steps of:
   a) providing an object oriented system data collector, the system data collector including:
      i) a collector controller providing an interface to the system data collector and a table of configuration data to control the operation of the system data collector;
      ii) a collection object to store collected system data, the collection of object including a plurality of repositories, with each of the plurality of repositories storing one of the plurality of system data types; and
      iii) a plurality of collector probes, each of the plurality of collector probes collecting a corresponding of the plurality of system data types as determined by the collector controller and storing the collected system data in the collection object;
   b) collecting the plurality of system data types with the plurality of collector probes; and
   c) storing the collected system data in the collection object.

42. The method of claim 41 further wherein the step of providing the plurality of collector probes comprises providing a base probe class and a plurality of subprobe classes, the base probe class defining the general operation of the at the at least one collector probe and the at least one subprobe classes defining the specific collection of the corresponding type of system data.

43. The method of claim 42 wherein the base probe class defines a virtual collection method for collecting system data, and wherein each of the plurality of subprobe classes implements the virtual collection method for collecting system data to collect the corresponding type of system data.

44. The method of claim 42 further comprising the step of creating a new collector probe for a new system data type by instantiating a new probe from the base probe class and from the subprobe class, the subprobe class defining the collection of the new system data type.

45. The method of claim 41 further comprising the step of reading the table of configuration data at run time to control the operation of the system data collector.

46. The method of claim 41 wherein the step of providing a system data collector additionally comprises adding:
   iv) a collector notifier providing notification to other systems of collection events as requested; and
   v) a collector synchronizer for tracking a system clock to synchronize data collection.

* * * * *